United States Patent [19]
Eftimakis et al.

[11] Patent Number: 5,889,781
[45] Date of Patent: Mar. 30, 1999

[54] ASYNCHRONOUS TIMING GENERATOR

[75] Inventors: Michel Eftimakis; Gianmaria Mazzucchelli, both of Antibes, France

[73] Assignee: VLSI Technology, San Jose, Calif.

[21] Appl. No.: 661,606

[22] Filed: Jun. 11, 1996

[51] Int. Cl.$^6$ ..................... H04J 3/12
[52] U.S. Cl. .......... 370/509; 370/301; 375/356; 375/357
[58] Field of Search ............ 370/503, 505, 370/506, 508, 509, 515, 301, 521; 375/202, 356, 357

[56] References Cited

U.S. PATENT DOCUMENTS

| | | | |
|---|---|---|---|
| 4,053,715 | 10/1977 | Drapkin | 370/506 |
| 4,353,128 | 10/1982 | Cummiskey | 370/301 |
| 4,748,617 | 5/1988 | Drewlo | 370/509 |
| 5,172,396 | 12/1992 | Rose, Jr. et al. | 375/356 |
| 5,581,748 | 12/1996 | Anderson | 375/357 |

Primary Examiner—Douglas W. Olms
Assistant Examiner—Shick Hom
Attorney, Agent, or Firm—Sitrick & Sitrick

[57] ABSTRACT

The asynchronous timing generator is comprised of a clock signal generator that generates a master clock signal. The master clock signal is used by a master clock counter to generate a bit clock. The master clock counter divides the master clock signal's frequency down to a lower frequency. Control signal information is extracted from the data stream's slot-framing to control the use of a predefined count value to a variable counter. The variable counter uses this lower frequency clock signal to generate the sub-bit count clock signal and slot bit numbers. These signals are generated in response to the control signals, coupled to the timer, indicating the different fields of the slot used to resynchronize data recovery in the received stream. In a preferred embodiment, the asynchronous timing generator is used in a communications transceiver device to permit resynchronization of received communications data.

33 Claims, 7 Drawing Sheets

| FIELD | PREAMBLE/SYNC | A FIELD | 1st B SUBFIELD | 2nd B SUBFIELD | LAST B SUBFIELD | X FIELD | Z FIELD |
|---|---|---|---|---|---|---|---|
| S | 0, 1, ..., 48, 49, | 0, 1, ..., 62, 63, | 0, 1, ..., 78, 79, | 0, 1, ..., 78, 79, | 0, 1, ..., 78, 79, | 0, 1, 2, 3, | 0, 1, 2, 3, |

ASYNCHRONOUS TIMING GENERATOR

BACKGROUND OF THE INVENTION

I. Field of the Invention

The present invention relates generally to clocking circuits. More particularly, the present invention relates to asynchronous clocking of formatted data compatible with a synchronous general frame timing.

II. Description of the Related Art

Radiotelephones have become a prevalent means for users to keep in contact with land-line telephone systems. The radiotelephones communicate over a radio channel with fixed base stations that are connected to the land-line telephone network.

There are many different radiotelephone systems in operation. These systems can be divided generally into analog and digital radiotelephone systems. The analog systems typically communicate with frequency division multiple access (FDMA) modulated signals while the digital systems transmit data frames using various types of digital transmission techniques.

Some time division multiple access (TDMA) type radiotelephones, such as ones designed according to the European Digital Enhanced Cordless Telecommunications (DECT) 300 175 specification from the European Telecommunications Standard Institute (ETSI), use timers that are fixed to a certain full slot data framing. As the need develops for shorter or longer slots, such as half slots or double slots, due to the addition of digital transmission features, the timing must be adapted to be able to receive and transmit these various length slots. A radiotelephone with a fixed timer will not be able to operate in a system with more than one slot size.

Additionally, if a radiotelephone is in contact with a first base station and later changes to another system's base station, the new base station will not be synchronized An example of this is when a cordless telephone is using an office building's cordless PBX and the user walks into the street where the telephone logs onto the cellular system, the cellular system has different timing than the PBX system. This causes problems for a fixed timing radiotelephone since the frames are coming in asynchronously. Also, fading and bouncing of signals off terrain and buildings will inject delays in receiving data; the data is received later than expected. There is a resulting need for an asynchronous timer to enable asynchronous communication, allow variable delays between transmit and receive data packets, and to maintain an asynchronous connection during a certain time.

SUMMARY OF THE INVENTION

The present invention encompasses an asynchronous timing generator that generates a sub-bit count clock signal along with the bit number of the field that is being received or transmitted. The sub-bit count clock signal is asynchronous to a reference bit count signal used to generate general frame timing and is based on receipt of a data stream. The asynchronous timing generator is comprised of a clock signal generator that generates the master clock signal. The master clock signal is used by a master clock counter to generate a bit clock. The master clock counter divides the master clock signal's frequency down to a lower frequency. An asynchronous timer uses this lower frequency clock signal to generate the sub-bit count clock signal and a slot bit number. These signals are generated in response to receipt of transmission of data. The bit number is asynchronous to the reference clock.

In a preferred embodiment, the slot bit number and sub-bit count clock signal are used by a formatter to decode and encode data. This data is received from the radio portion of the present invention, decoded by the formatter using the above signals and stored in memory. The data to be transmitted is retrieved from memory, encoded into fields and subfields using the above signals and transmitted over the radio portion.

These and other aspects and attributes of the present invention will be discussed with reference to the following drawings and accompanying specification.

DETAILED DESCRIPTION OF THE PREFERRED EMBODIMENT

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

The asynchronous timer of the present invention enables a communications device to operate without being synchronized to a reference timer. The actions of the communication device's circuitry are based on the bit number of a frame's field and not on a certain reference time.

The present invention is subsequently described as being used in a radiotelephone. However, the present invention can also be used in any apparatus requiring asynchronous timing.

In the preferred embodiment, the radiotelephone operates in a digital radio system that transmits and receives data in a 10 ms frame format. These frames are comprised of 48 half slots (240 bits each). In the preferred embodiment, a pair of slots correspond to each communication channel. Each slot should begin 5 ms after the beginning of the other. However, due to delays between transmit and receive, this delay varies depending on terrain, buildings and distance that delay the signals. Alternate embodiments use different size frames and a different number of slots per communication channel.

The slot pair for each communication channel are of the same type, such as half slots, full slots, or double slots. Alternate embodiments use different size slots. The slots of the present invention are illustrated in FIGS. 1 and 2.

Figure 1:
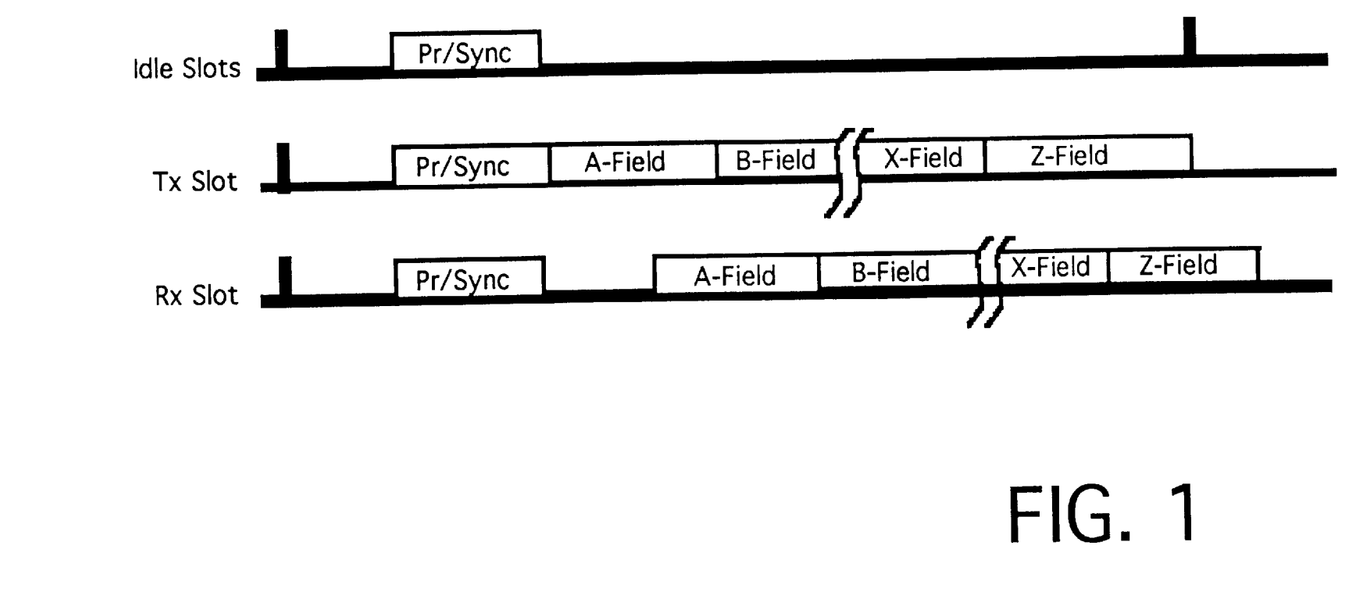
FIG. 1 shows sequences of the fields that constitute different slots.

FIG. 1 illustrates three different formats for the slots: idle, transmitting, and receiving. When the radiotelephone is not receiving or transmitting a call the radiotelephone is counting the idle slots on the channe. These idle slots are comprised of the preamble/synchronization field only. The preamble/synchronization field contains 50 bits. The number of bits in the preamble/synchronization field varies with alternate embodiments, depending on the requirements of the system design.

Figure 2:
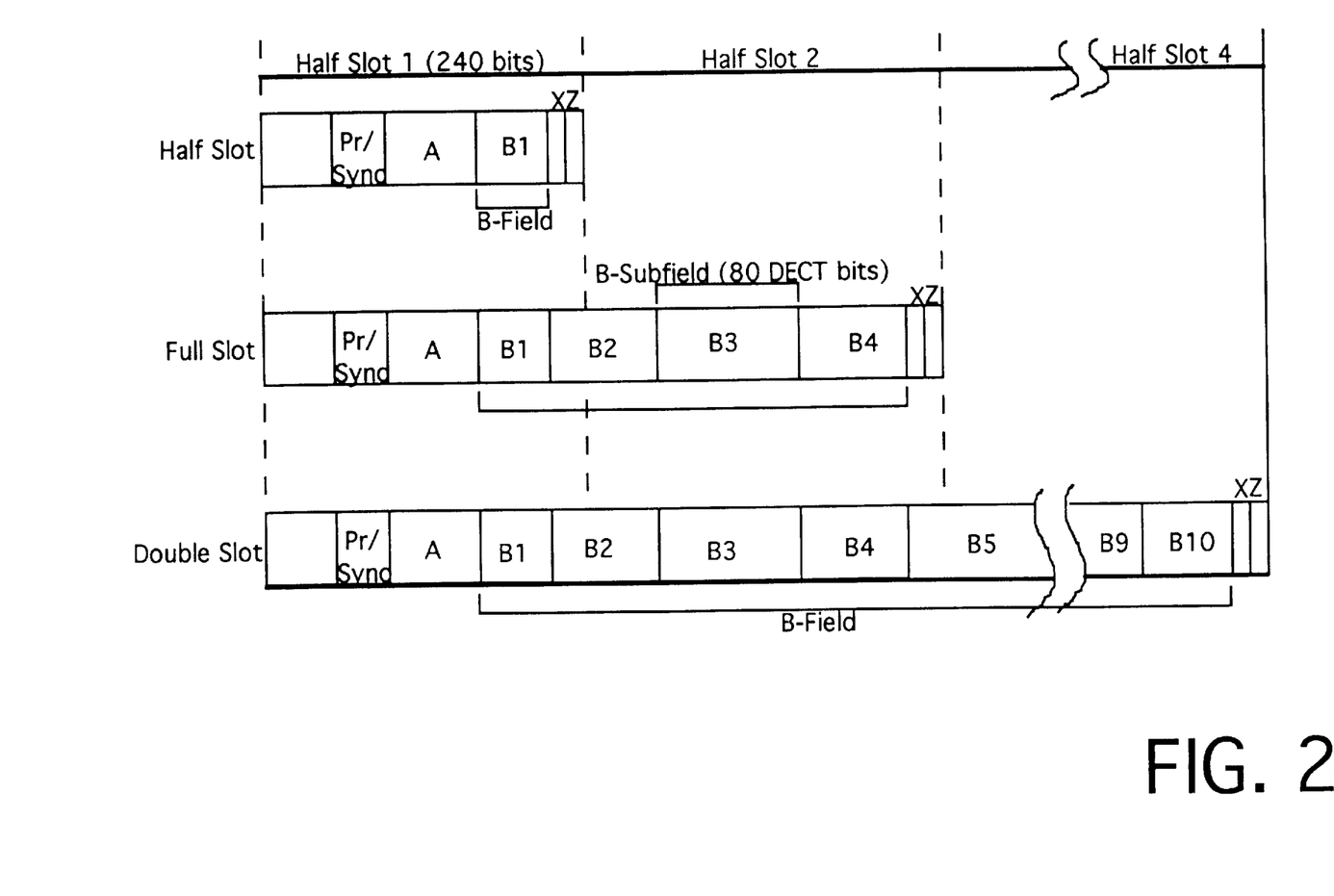
FIG. 2 shows the composition of different size slots.
Figure 3:
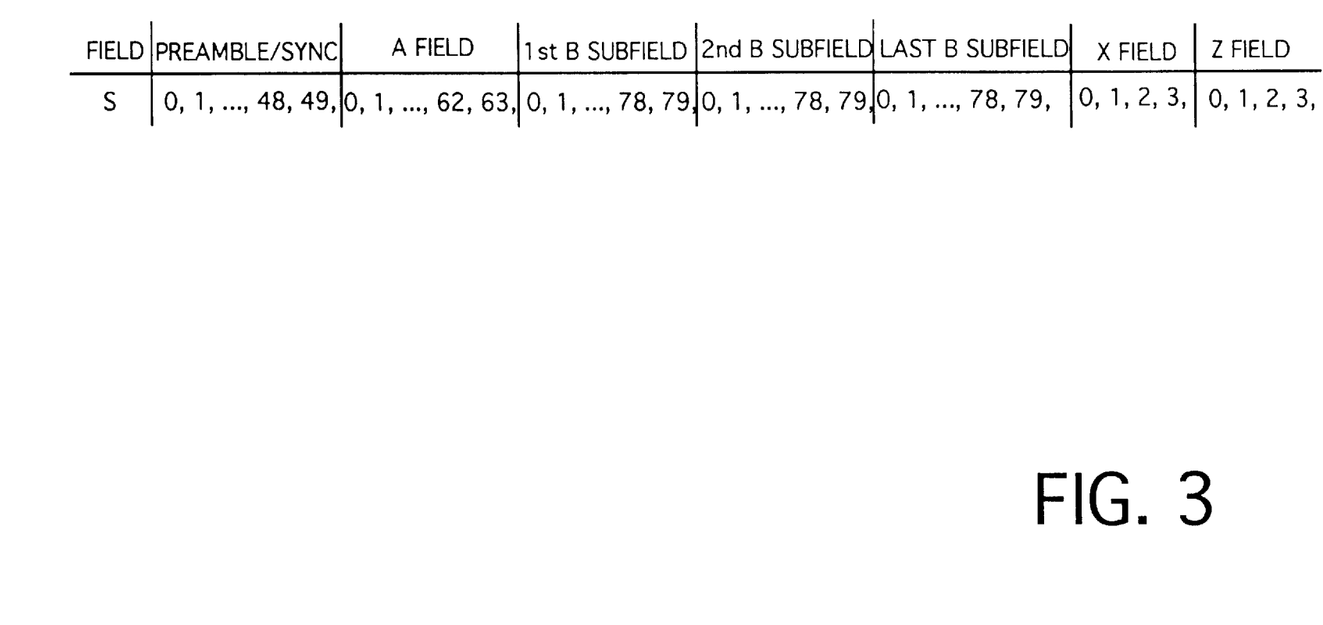
FIG. 3 shows a listing of the sub-fields with the count of the asynchronous timer.

A slot transmitted by the radiotelephone is comprised of the same preamble/synchronization field of the idle state plus an additional A-Field, a B-Field, an X-Field, and a Z-Field, as illustrated in FIGS. 1–3. The A-Field contains 64 bits while the X and Z-Fields are each 4 bits. The B-Field is 320 bits, which is a minimum of four subfields, but can be comprised of many sub-fields, each having 80 bits. Alternate embodiments use fields having different sizes than the above, and can use additional or alternative fields.

A slot of data received by the radiotelephone from the base station is illustrated in FIG. 1 as being comprised of the preamble/synchronization field that is separate from the A-Field, unlike the transmit slot. The preamble/synchronization field is separate since the preamble/synchronization field position cannot be known a priori exactly in the receive mode. It is the last bit of the sync field that indicates the exact position of the receive slot (when this bit is received, the synch is detected). The preamble/synchronization field is placed at the position where it would be if there was no transmission delay. Alternate embodiments, if they have a preamble/synchronization field, place it at different locations. The receive slot is also comprised of the B, X, and Z-Fields as described in the transmit slot.

The different fields are used for different control and data functions, depending on the application. In the preferred embodiment, the A-Field contains header information regarding the following B-Field, channel control data, paging messages, and/or synchronization information. The A-Field informs the radio interface if the B-Field contains voice, data, or control information. The B-Field contains the actual data of the slot. This data can take the form of the digitized speech from the transmitting station, either radiotelephone or base station, data from a device such as a computer, or control information.

The X-Field contains the cyclic redundancy check (CRC) data, calculated over chosen bits of the B-Field. As is well known in the art, CRC data provides error detection/correction capability. The Z-Field is copied from the X-Field and is used to verify that even in the case of a transmission delay, the end of the slot does not mix with the beginning of the next slot.

FIG. 2 illustrates the preferred embodiment make-up of the different size slots (data packets). The different size slots are comprised as follows:

a half slot is a slot that has 1 subfield. This slot is totally included in a 240 bit half slot.

| Guard band + pr/sync = 88 bits | |
|---|---|
| A-Field | = 64 bits |
| B-Field | = 80 bits |
| X-Field | = 4 bits |
| Z-Field | = 4 bits |
| TOTAL | = 240 bits | a full slot is a slot that has 4 B subfields. This slot is totally included in a 480 bit full slot (see also FIG. 3).

| Guard band + pr/sync = 88 bits | |
|---|---|
| A-Field | = 64 bits |
| B-Subfield x-4 | = 320 bits |
| X-Field | = 4 bits |
| Z-Field | = 4 bits |
| TOTAL | = 480 bits | a double slot is a slot that has 10 B subfields. This slot is totally included in two 480 bit full slots (see also FIG. 3).

| Guard band + pr/sync = 88 bits | |
|---|---|
| A-Field | = 64 bits |
| B-Subfield x 10 | = 800 bits |
| X-Field | = 4 bits |
| Z-Field | = 4 bits |
| TOTAL | = 2 x 480 bits |

The half slot and full slot are always of the same length. In the preferred embodiment, "half" means 1 Subfield, "full" means 4 Subfields, and "double" means 10 Subfields.

Alternate embodiments use other size slots with different fields and sub-fields. Also, other embodiments use different fields for other purposes than described for the preferred embodiment.

Figure 4:
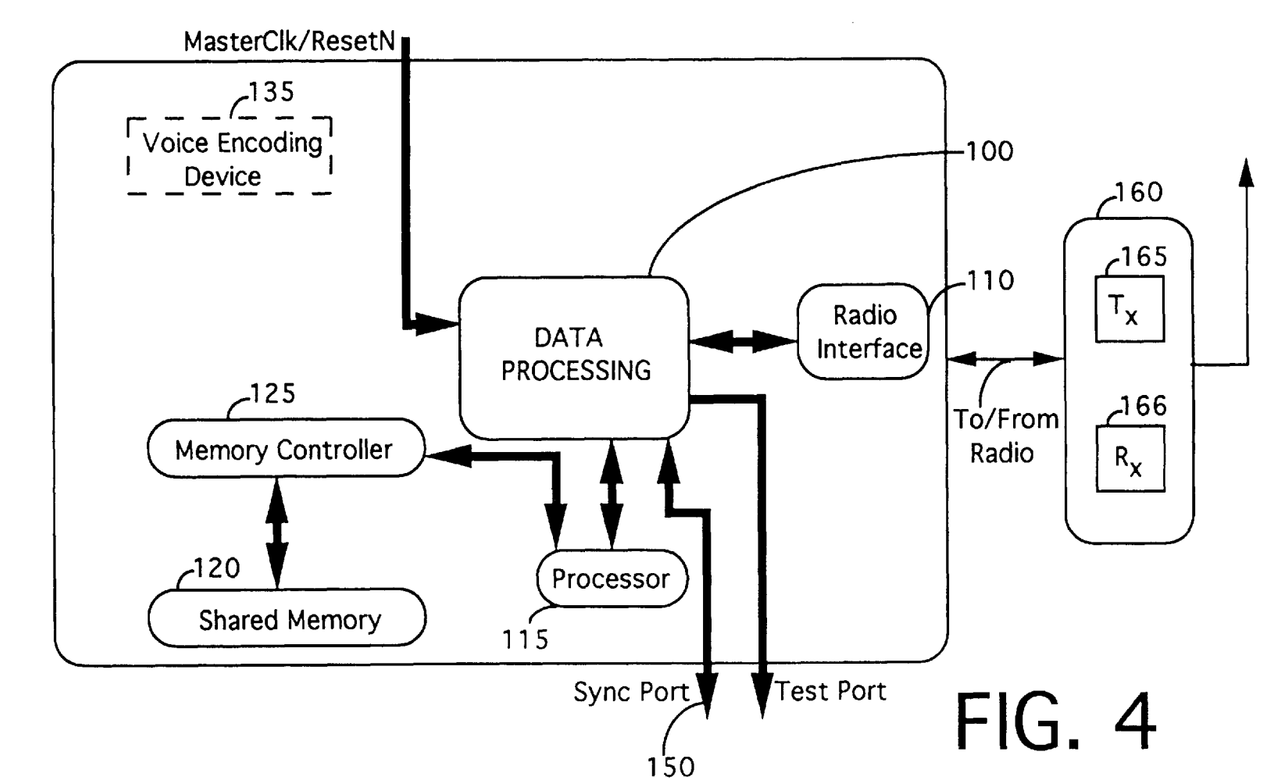
FIG. 4 shows a block diagram of a data processing system incorporating the timing subsystem of the present invention, providing an environment for a physical layer processor.

The physical layer processor incorporating the timer of the present invention is illustrated in a radiotelephone apparatus in FIG. 4. The physical layer processor (100) is comprised of a CPU, instruction memory (e.g., ROM) to provide working read-write memory (e.g., RAM), which decodes data streams, comprised of the above slots that are received from the radio interface portion (110) of the communications device, into specific data formats for storing into the shared memory (120). The physical layer processor (100) also performs the reverse operation of encoding the data stored and output from memory (120) into the proper fields for transmitting as a data stream.

The shared memory (120) is random access memory (RAM) in the preferred embodiment. Alternate embodiments use other types of read/write memory.

The central processing unit (CPU) (115) reads and writes to the registers of the physical layer processor (100), thereby controlling its operation. The memory controller (125) accesses the shared memory (120) and performs arbitration between the physical layer processor (100) and the CPU (115) accessing the memory (120). If a voice encoding device (135 shown in phantom) is accessing shared memory (120), as in the case of voice transmission, the memory controller (125) arbitrates its access also.

The radio interface (110) interfaces the physical layer processor (100) to the radio portion of the present invention. The radio portion (160) is comprised of a transmitter (165) and a receiver (166) that communicate the frames of data over a channel. The radio interface (110) couples the data frames from the receiver transmitter to the physical layer processor (100).

Figure 5:
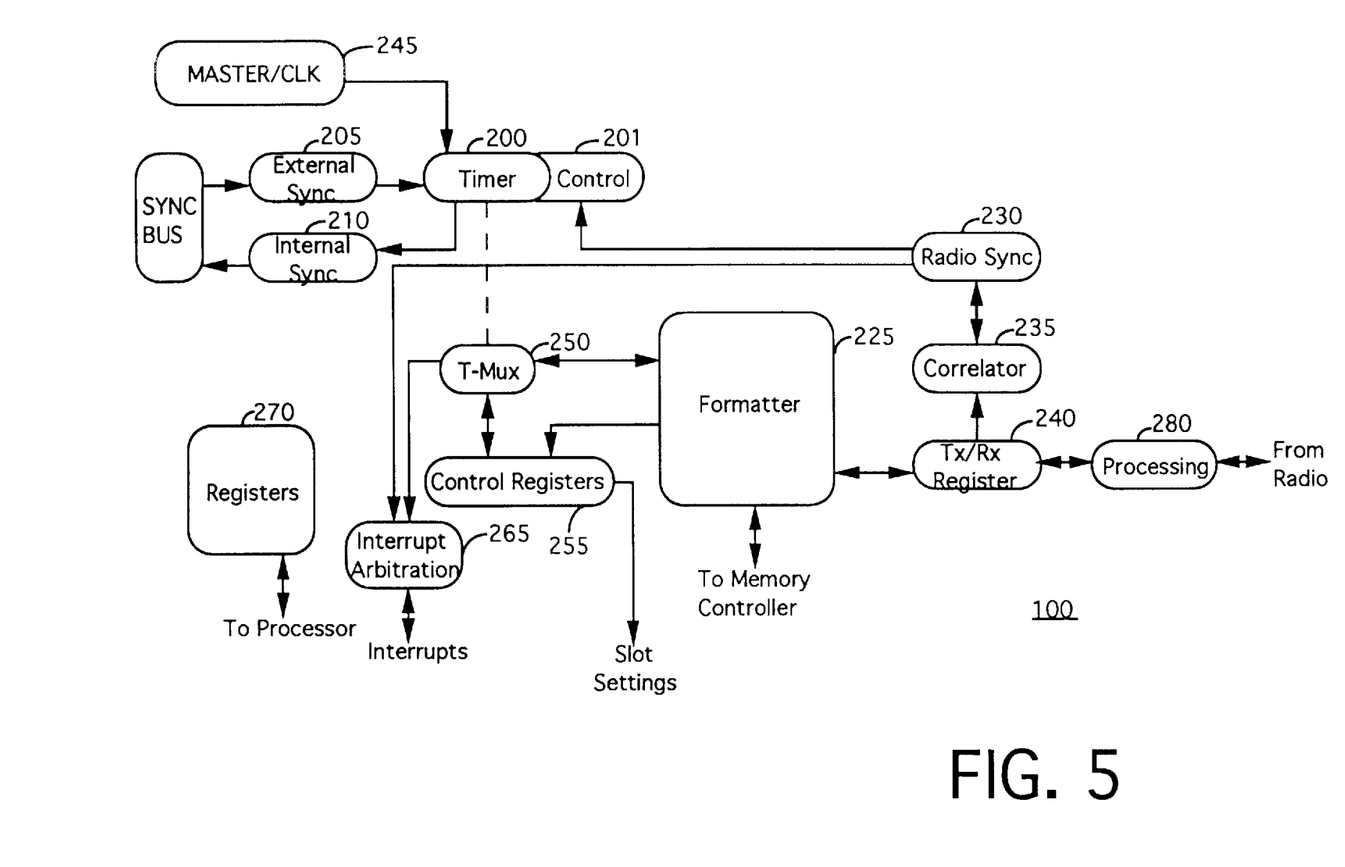
FIG. 5 shows a block diagram of the physical layer processor.

FIG. 5 illustrates relevant portions of the preferred embodiment of the physical layer processor (100). The radio portion (160) interfaces to the physical layer processor (100) through the Tx/Rx register (240). This register (240) is a serial to parallel and parallel to serial converter. Between the Tx/Rx register (240) and the radio interface (110) there is additional processing (280) to prepare data for air transmission. The processing includes encryption, scrambling, and generating a CRC.

The formatter (225) is a decoder/encoder that extracts timing information from the data stream received from the radio portion via the Tx/Rx register (240), such as the bit number within the slot, half slot number in a frame, and which field is being operated on, responsive to the timer subsystem (200). The formatter (225) fetches or stores data from or to the RAM (120) through the memory controller (125) of FIG. 4.

The control registers (255) are used by the formatter (225) of FIG. 5 to store slot related information from the data stream such as number of subfields (n), data pointers, and status flags. The control registers are updated with data stored in the RAM and writes data back to the RAM when applicable, such as status data.

The T-Mux block (250) is used by the formatter to choose what goes into the A-Field according to the DECT standard algorithm. The interrupt block (265) arbitrates interrupts from the physical layer processor (100) to the CPU (115) of FIG. 4. These interrupts can come from the formatter (225) or the radio synchronization circuit (230). Additionally, the registers (270) are used by the CPU (115) to store general control information that are applicable to all slots such as synchronization settings and test information. These registers (270) also store information that is useful to the CPU such as the half slot number and the frame number.

The radio synchronization circuit (230) is used to generate a synchronizing word pulse output internally coupled to timer/control circuit (200, 201) and to internal sync generator (210) when the synchronization word has been detected by the correlator (235). The synchronization word pulse informs the timer/control circuit (200, 201) when the synchronization word has been received. The radio synchronization circuit (230) works together with the correlator (235). The correlator (235) compares the received word coupled thereto from the TX/RX resulting from the radio via the processing circuit (280) to the expected one as previously loaded by the processing circuit (280) via the RX/TX register (240), and is able to detect the pattern even when some bits are wrong. The correlator (235) interfaces the Tx/Rx register (240) to the radio synchronization block (230).

The timer control circuit (201), illustrated in FIG. 7 and described subsequently in greater detail, is used to provide control information to the timer (200) of the present invention. This control information includes telling the timer (200) when certain fields of the slot are being received. For example, when the A-Field is being received from the radio, the radio synchronization circuit (230) informs the timer control (201) that this field is present. The timer control (201) passes this information along to the timer (200) that uses it to reset a counter to be described later in greater detail.

The timing for the present invention is provided by a 6.912 MHz master clock (245). In the preferred embodiment, this clock is provided by a crystal oscillator. Other embodiments can use other clock sources and other clock frequencies.

The external synchronization block (205) provides a synchronization pulse to the timer (200) to synchronize it to an external source such as a base station. The external synchronization block (205) and timer (200) interact such that the two can functionally be considered a digital phase locked loop (DPLL). The internal synchronization block (210) receives an output from the timer (200) to provide an internal sync output to synchronize an outside source to the timer (200) of the present invention.

Figure 6:
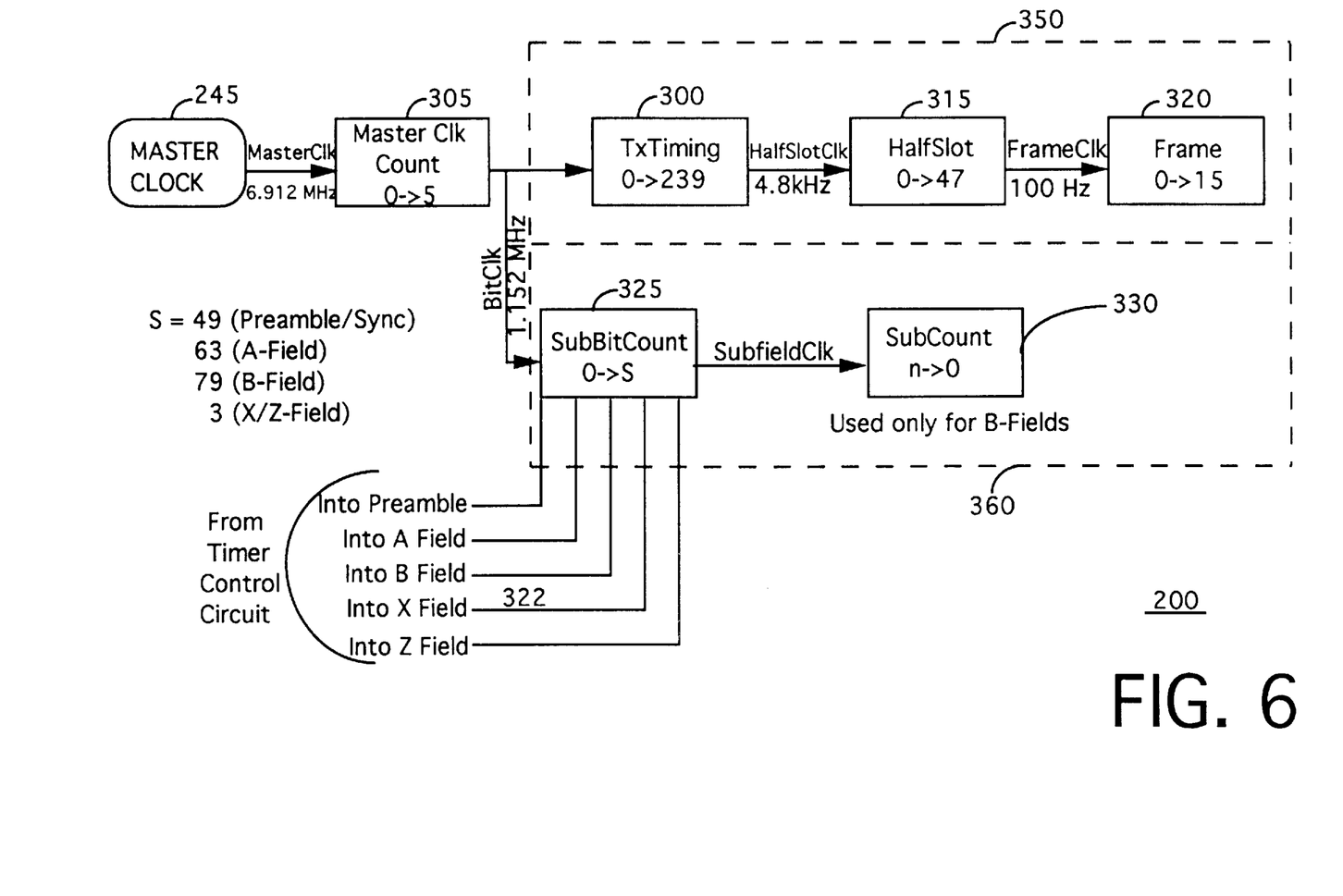
FIG. 6 shows a block diagram of the timer circuit of the physical layer processor.

The timer (200) of the present invention is illustrated in FIG. 6. The master clock signal is divided down by a Master Clock Counter (305) that produces a BitClock signal of 1.152 MHz. This clock signal is divided down to the HalfSlotClk signal frequency of 4.8 kHz by the TxTiming counter that counts from 0 to 239 since a half slot consists of 240 bits. The HalfSlotClk is used to count half slots. This clock signal is also used for interrupt alignment so that whenever an interrupt is sent to the CPU, it is sent on a HalfSlotClk boundary.

The HalfSlotClk is input to a HalfSlot counter (315) that divides the frequency of this clock signal down to a 100 Hz signal by counting from 0 to 47 since there are 48 half slots in a frame (there are 24 full slots in a frame). This is the FrameClk signal. The FrameClk signal is input to a Frame counter (320) that counts from 0 to 15. This counter (320) generates a frame number that is used as a seed value in the processing circuit (280) of FIG. 5 for data processing such as scrambling, encryption, etc. The frame number is also output to other subsystems, such as the data processing circuit.

The 1.152 MHz BitClk is also input to a SubBitCount counter (325). This counter counts from 0 to S, where S is the various lengths of the fields of the slots discussed above. FIG. 3 shows a summary of the various values of S depending on the field being counted. The value of S is programmed into counter (325).

The value of S changes depending on the control signal received from the time control circuit (201) of FIG. 5. For example, if the control signal from the timer control circuit indicates that the A-Field is present, the counter counts to 63.

Figure 7:
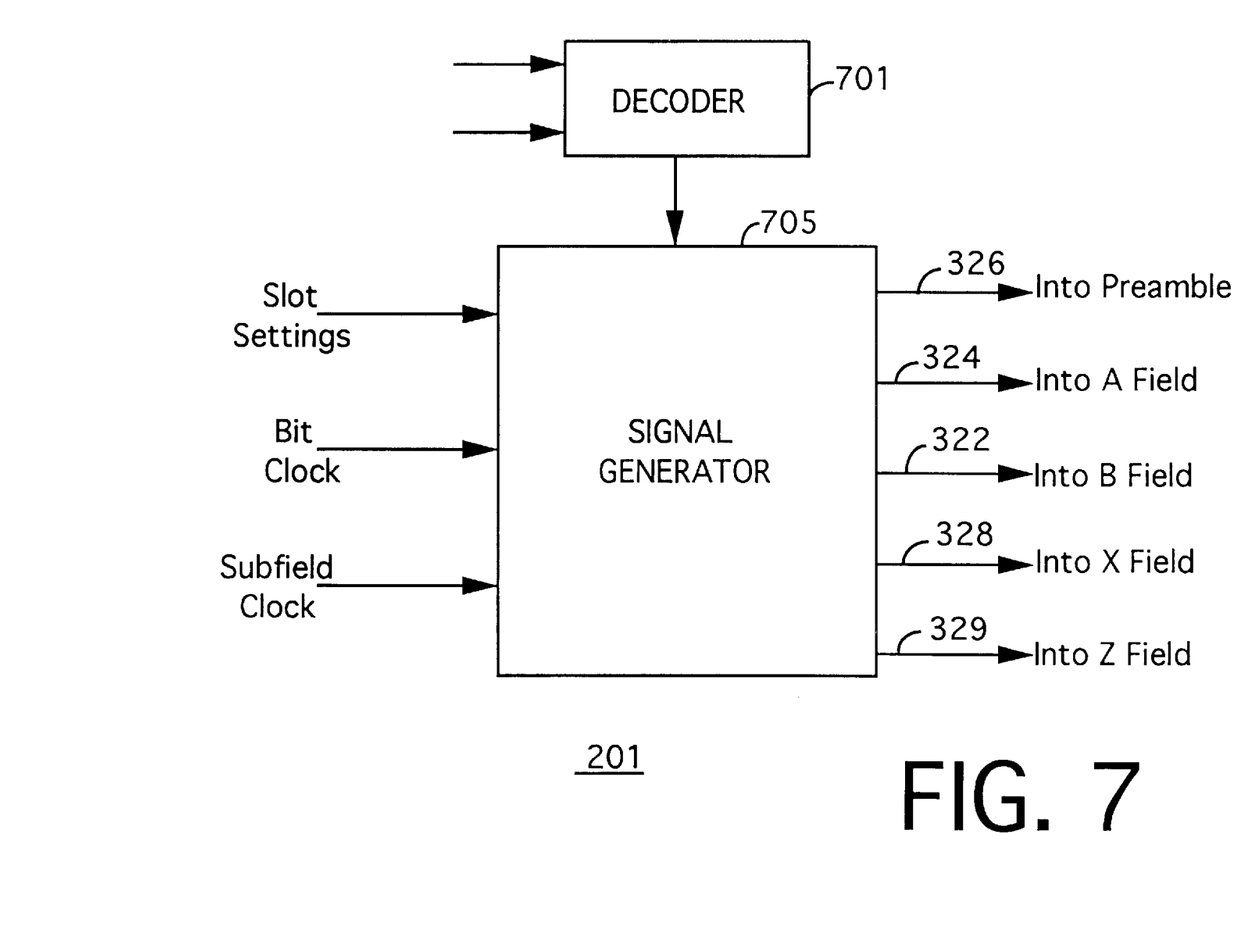
FIG. 7 shows a block diagram of the timer control circuit of the present invention.

Referring to FIG. 7, the timer control circuit is comprised of a decoder circuit (701) and a signal generator (705). The decoder circuit (701) uses the clocks from the TxTiming counter and the SubBitCount clock pulses to determine the location in the slot that is being processed. By counting the incoming SubBitCount clock, that is counting the number of bits in the slot, the decoder knows the location in the slot. The TxTiming clock is used for timing reasons.

The slot position from the decoder (701) is supplied to the signal generator (705) to help generate the various field control lines that indicate to the timer the location in the slot being processed. These control lines are labeled IntoPreamble, IntoAField, IntoBField, IntoXField, an IntoZField in FIG. 7. Each of these control lines are connected to a control input of the SubBitCount counter (325) of FIG. 6. These are the control lines that cause the counter (325) to count up to S.

The other control inputs to the signal generator (705), slot settings, BitClk, and SubFieldClk, are used to generate the field control lines. The 'slot settings' input comes from the control registers (255) of FIG. 5. These settings inform the signal generator (705) of the size of the B-Field, the existence of a Z-Field, and whether the present invention is in the transmit mode or the receive mode. The 'BitClk' input clocks the signal generator (705) while the 'SubFieldClk' is used to clock B-Subfields.

As an example of signal generator (705) operation, when the signal generator (705) determines, from the decoder input, that it is time to start a preamble field, it drives the IntoPreamble signal high after being clocked by the BitClk. The IntoPreamble signal resets the SubBitCount counter (325) to zero and enables it to count up to 49. When the decoder (701) informs the signal generator (705) that the A-Field is present, the IntoAField signal is driven high after being clocked by the BitClk This resets the SubBitCount counter (325) to zero from the Preamble count and enables the SubBitCount counter to count up to 63 for the A-Field. This operation continues for the other fields.

An example of a transmit operation and state flow of the SubBitCount counter (325) is illustrated as follows. The counter (325) was reset to zero from the end of the previous slot. Therefore, when the time for the preamble/synchronization field arrives, the timer control circuit makes the preamble/synchronization line true. One embodiment uses flags, such as control data stored in RAM registers etc. This line instructs the counter (325) to count from 0 to 49 since the preamble/synchronization field is 50 bits in length.

When the counter (325) reaches 49 (the end of the preamble/synchronization field), it is reset to 0 by a logical high on the A-Field control line from the timer control (201). The counter (325) counts from 0 to 63 for the A-Field. At this point, the control part of the timer does not drive the count, but changes the flag status each time the counter (325) is reset.

When the timer control (201) detects a B-Field being received, it brings the B-Field line (322) to the counter (325) to a logical high thus informing the counter (325) that a B-Field is being received. The counter (325) then resets to 0 and counts to 79 for the 80 bits in the B-Field. If no B-Field was detected, the SubBitCount counter (325) stops counting after the A-Field since, in the preferred embodiment, there are no X/Z-Fields if there is no B-Field.

If additional B-subfields are detected, the timer control (201) informs the counter (325) of this by bringing the B-Field line high again. The counter (325) then continues to count from 0 to 79 for each sub-Field detected.

Finally, when the X and Z-Fields are detected, they are treated in a similar manner in that the counter (325) is reset by appropriate control lines from the timer control (201) and counts from 0 to 3 for each of these fields since they contain 4 bits each. After the slot is done, the SubBitCount counter (325) is reset for the next incoming slot.

When a B-Field is detected, the SubCount counter (330) counts the number of B-Fields detected. This is accomplished by the SubfieldClk generated by the SubBitCount counter (325). This clock goes high for every B sub-Field detected.

As the SubfieldClk clocks the SubCount counter (330), the counter (330) counts down from n to 0. The value of n is stored in the control registers (255) as described above in FIG. 5 and refers to the number of B-Subfields detected. Alternate embodiments can count up to a predetermined number.

The count from the SubCount counter is used by the data processor (100) to count the correct number of subfields. This count is used to inform the relevant circuit elements when the data transmission (or reception) will end.

As described above, the timer of FIG. 6 is broken up into two major portions. The upper portion (350) generates the frame reference timing. The lower portion (360) generates the slot related timing. The slot related timing can be shifted from the reference timing by any number of bits, up to 240 bits (a half slot's duration) depending on when the slot is received.

In the preferred embodiment, the HalfSlotClk and FrameClk outputs are reduced in active pulse width to a single MasterClk cycle by gating them with the BitClk from the MasterClkCount counter (305). This reduces the duration of these pulses so that they may be used as clocks by other blocks.

FIG. 7 shows the controller (210) of FIG. 5 in further detail, illustrating the generation of control signal outputs (322, 324, 326, 328, and 329) (such as Into-B-field signal (322) of FIG. 6), responsive to slot settings, BitClk and SubfieldClk signals and the BitCount and SubBitCount signals.

In summary, the timer of the present invention provides for independence from the absolute timing of the master clock by independently resynchronizing data communication in slot related timing, wherein it decodes data independent of the originating timing of when it should have been received, based on the master clock timing. The received data flow is checked to detect synchronization. After the synchronization detection (start of the A-Field), the slot counting goes on without needing information from the received flow. When the counter arrives to its maximum value for the current field, the next one (field count cycle) is activated and the count starts over at 0. This creates a continuous timing base for the incoming data stream that helps the processing of the data packets.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. An asynchronous timing generator that generates a sub-bit count clock signal that is based on a data stream, the data stream comprised of a field and a subfield, the field and the subfield each having a respective defined position in the data stream, the generator comprising:

a clock signal generator for generating a master clock signal;

a master clock counter, coupled to the clock signal generator, for generating a bit clock signal by dividing the frequency of the master clock signal to a predetermined bit clock frequency that is lower than the master clock frequency;

a controller, responsive to the data stream, for generating a count value signal, wherein the count value signal is representative of the respective defined position in the data stream; and a variable counter, responsive to the count value signal, the bit clock signal, and the data stream, for generating the sub-bit count clock signal and a slot-related value representative of the respective position in the data stream.

2. The generator of claim 1 and further including a sub-count counter, coupled to the variable counter, for generating a sub-field clock signal from the sub-bit count clock signal, for counting repetitions of a sub-field.

3. The generator of claim 1, wherein the sub-bit count clock signal is used to clock radiotelephone data frames.

4. The generator of claim 1, wherein the sub-bit clock signal is used as a seed value signal coupled to a processor.

5. An asynchronous timing generator that generates a sub-bit count clock signal that is synchronized to a data stream, the generator comprising:

a clock signal generator for generating a master clock signal;

a master clock counter, coupled to the clock signal generator, for generating a bit clock signal by dividing the frequency of the master clock signal to a predetermined bit clock frequency that is lower than the master clock frequency;

a controller for generating a plurality of control lines, each control line representative of a respective position in the data stream; and a variable counter, coupled to the master clock counter and the controller, for generating, in response to the plurality of control lines and the bit clock frequency, the sub-bit count clock signal and a bit number indicating a specific position in the data stream.

6. The generator of claim 5, wherein the sub-bit count clock signal clocks radiotelephone data frames.

7. The asynchronous timing generator of claim 5 and further including a radio interface, coupled to the controller, for providing data to the controller from which the control lines are generated.

8. The generator of claim 7, wherein the data from the radio interface are data frames received over a channel.

9. An asynchronous timing generator that generates a sub-bit count clock signal that is synchronized to data slots, the generator comprising:

a clock signal generator for generating the master clock signal;

a master clock counter, coupled to the clock signal generator, for generating a bit clock signal by dividing the frequency of the master clock signal to a predetermined bit clock frequency that is lower than the master clock frequency;

a controller for generating a plurality of control lines in response to a data stream, each control line indicating a field or subfield position in the data stream;

a variable counter, coupled to the master clock counter and the controller, for generating, in response to the plurality of control lines and the bit clock signal, the sub-bit count clock signal and a bit number indicating a position in the data stream; and a data formatter, coupled to the variable counter, for storing and retrieving data in response to the bit number and sub-bit count clock signal.

10. The generator of claim 9, wherein the data formatter stores and retrieves radiotelephone data.

11. The generator of claim 9 and further including a radio interface, coupled to the controller, for generating the data stream in response to information received over a radio channel.

12. The generator of claim 9 and further including an external synchronization circuit coupled to the variable counter, the external synchronization circuit producing a synchronization pulse to synchronize the counter to an external source.

13. The generator of claim 9 and further including an internal synchronization circuit couple to the variable counter, the internal synchronization circuit receiving a synchronization pulse from the counter to synchronize external sources to the counter.

14. A method for decoding a received data stream of slots having a plurality of fields and sub-fields, the method comprising the steps of:

generating control signals in response to the plurality of fields and sub-fields;

generating a master clock signal;

generating a sub-bit clock signal and a bit position in response to the control signals and the master clock signal; and decoding the data stream in response to the sub-bit clock signal and the bit position.

15. The method of claim 14, and further including the step of changing the decoded data stream to an analog format to be radiated by a speaker in the form of sound waves.

16. The method of claim 14, and further including the step of coupling the decoded data stream to a computer for further data processing.

17. The method of claim 14 and further including the step of storing the decoded data stream.

18. A method for transmitting a data stream of slots having a plurality of fields and sub-fields, the method comprising the steps of:

generating a plurality of control signals to indicate locations of the plurality of fields and sub-fields;

generating a master clock signal;

generating a sub-bit clock signal and a bit position in a slot in response to the control signals and the master clock signal; and encoding the slots, in response to the sub-bit clock signal and the bit position, into the fields and sub-fields.

19. The method of claim 18 and further including the step of retrieving data from a memory to be encoded.

20. A radiotelephone that operates in a digital radiotelephone system, the radiotelephone comprising:

a receiver for receiving information over a first radio channel;

a transmitter for transmitting information over a second radio channel;

a radio interface for converting the received information into a received data stream comprising slots and for converting a data stream to be transmitted, comprising slots, into the transmitted information;

a clock signal generator for generating a master clock signal;

a master clock counter, coupled to the clock signal generator, for generating a bit clock signal by dividing the frequency of the master clock signal to a predetermined bit clock frequency that is lower than the master clock frequency;

a controller for generating a plurality of control lines, each control line indicating a position in the received and transmitted slots; and a variable counter, coupled to the master clock counter and the controller, for generating, in response to the plurality of control lines and the bit clock frequency, the sub-bit count clock signal and a slot-related bit number indicating a position in the data stream.

21. The radiotelephone of claim 20, wherein the sub-bit count clock signal clocks radiotelephone data frames.

22. A data processing apparatus for coupling a radio interface to memory, the apparatus comprising:

a memory controller, coupled to the memory, for arbitrating access to the memory;

a controlling processor for controlling the apparatus, the controlling processor coupled to the memory controller;

a data processor, coupled between the radio interface and the controlling processor, for decoding information received from the radio interface into a format to be stored in the memory and for encoding data stored in the memory to be transmitted by the radio interface;

an encryption/decryption device, coupled to the data processor, for encrypting the data to be transmitted and decrypting the information received from the radio interface; and a synchronization port, coupled to the data processor, for synchronizing external data elements to the data processing apparatus.

23. The apparatus of claim 22, wherein the radio interface couples a radio transmitter and radio receiver to the apparatus.

24. A communications receiver system, for receiving a data stream, comprised of communications data signals transmitted in a frame format wherein each frame is comprised of a plurality of slots, wherein during transmission each slot begins after a related slot, the communications receiver system comprising:

means for receiving the transmitted data stream having a predefined format comprised of a plurality of fields having a predefined format;

formatter means for extracting timing information from the data stream and providing an output comprised of a bit number within the slot, the slot number within a frame, and the current field being operated upon; and     means for storing and retrieving communications data signals responsive to said formatter means output.

25. The system of claim 24, wherein at least one field is comprised of a variable integer number of a plurality of said fields.

26. The system as in claim 24, wherein the related slots are comprised of a receive slot and a transmit slot which as a pair correspond to a communication channel.

27. An asynchronous timing generator for time-shift tracking and generating a sub-bit count clock signal based on a data stream, said generator comprising:

a clock signal generator for generating a master clock signal;

means for generating a bit clock output by dividing the master clock signal to a predetermined bit clock frequency lower than the master clock frequency,     a variable counter, coupled to the master clock counter and the data stream, for generating the sub-bit count clock signal and a slot position output responsive to the data processing means and the bit clock output; and     means for storing and retrieving data from the data stream responsive to the sub-bit count clock signal.

28. An asynchronous timer system for permitting asynchronous communication of data in a synchronous fixed-slot, data framing communications system, said asynchronous timer system comprising:

means for detecting delays between transmit and receive data packets,     means for adjusting receiver timing control circuitry responsive to decoding and tracking the fixed-slot data framing to compensate for the variable delays between the transmit and receive data packets; and     means for maintaining a synchronous connection and selectively storing and retrieving the data from a memory responsive to the means for adjusting.

29. A communications receiver system, for receiving a data stream transmitted in synchronization with a predefined clock rate providing synchronous timing, in a frame transmission having a plurality of frames, each frame having a plurality of slots, each slot having one or more fields, the communications receiver system comprising:

clock generator means for generating a clock signal at the fixed clock rate of the transmitter;

position decoder means, responsive to the received data stream, and the clock signal, for correlating data stream bit position independent of said synchronous timing of the transmitted data stream, and providing a bit position signal output;

programmable timer means, for providing a bit position clock signal output, asynchronous to the corresponding originating transmitter clock signal output corresponding to that transmitted bit position responsive to the clock signal and the bit position signal; and     memory for storing and retrieving information from the data stream responsive to the bit position clock signal output and the data stream.

30. The system of claim 29, wherein at least one of said fields has a variable number of like-type fields.

31. A method for communication, for receiving a data stream transmitted in synchronization with an originating transmitter clock signal at a predefined clock rate, in a frame transmission, having a plurality of frames, each frame having a plurality of slots, each slot having one or more fields, the method comprising:

generating a clock signal at the fixed clock rate of the transmitter;

correlating data seam bit position independent of absolute timing, and providing a bit position signal output, responsive to the received data stream, and the clock signal;

generating a bit position clock signal output, asynchronous to the corresponding originating transmitter clock signal output corresponding to that transmitted bit position responsive to the clock signal and the bit position signal; and     storing and retrieving information from the data steam into and from a memory circuit responsive to the bit position clock signal output and the data stream.

32. A method as in claim 31, wherein at least one of the fields has a variable number of like type fields.

33. A communications receiver system, for receiving a data stream transmitted at a predefined bit clock rate in frames, each frame comprised of a plurality of slots, each slot comprised of a plurality of fields which is variable within a predefined range, said system comprising:

a master clock generator for generating a master clock signal;

a master clock counter for generating a bit clock signal at the predefined bit clock rate responsive to the master clock signal;

control means, responsive to the data stream, for outputting a control signal representative of the field position in the data stream;

programmable counter means, coupled to the master clock counter and the control means, for generating a sub-bit clock signal and a bit number position signal responsive to the control signal and the bit clock signal, by dividing the bit clock signal by a count number programmed responsive to the control means; and     means for storing and retrieving received data from the data steam responsive to the programmable counter means.

* * * * *